Aug. 31, 1965 R. L. RILEY 3,204,121

READ AMPLIFIER INCLUDING DIFFERENTIAL TRANSISTOR CIRCUIT WITH INDUCTIVE AND UNIDIRECTIONALLY CONDUCTIVE LOAD ARRANGEMENT

Filed May 2, 1962 2 Sheets-Sheet 1

INVENTOR.
RAY L. RILEY,
BY
Walter J. Adam
ATTORNEY.

Aug. 31, 1965 R. L. RILEY 3,204,121

READ AMPLIFIER INCLUDING DIFFERENTIAL TRANSISTOR CIRCUIT WITH INDUCTIVE AND UNIDIRECTIONALLY CONDUCTIVE LOAD ARRANGEMENT

Filed May 2, 1962 2 Sheets-Sheet 2

INVENTOR.
RAY L. RILEY,
BY
Walter J. Adam
ATTORNEY.

United States Patent Office 3,204,121
Patented Aug. 31, 1965

3,204,121

READ AMPLIFIER INCLUDING DIFFERENTIAL TRANSISTOR CIRCUIT WITH INDUCTIVE AND UNIDIRECTIONALLY CONDUCTIVE LOAD ARRANGEMENT

Ray L. Riley, Los Angeles, Calif., assignor to Hughes Aircraft Company, Culver City, Calif., a corporation of Delaware Filed May 2, 1962, Ser. No. 193,647
9 Claims. (Cl. 307—88.5)

This invention relates to circuits for reading information from magnetic memory devices and particularly to a highly reliable transistor read amplifier that responds to the polarity change of an input signal to provide triggering at the output.

The process of reading information from magnetic memory devices such as magnetic cores or the surface of a drum commonly requires that a flip flop circuit be set to a state that depends upon the polarity of the sensed memory output signal. In order to carry out this operation, a read amplifier is required that detects the polarity or polarity change of the memory output signal and performs a gating operation so as to trigger the flip flop to appropriate states. Prior art read amplifiers such as feedback amplifiers are generally limited to a low bandwidth of operation, are sensitive to noise signals and are relatively unreliable because the operation is relatively dependent on the amplitude of the memory output signal. This dependence on the amplitude of the memory output signal is especially critical when sensing information from a magnetic drum where variations in the distance from the drum of different read heads causes the sensed voltage amplitude to vary over a wide range.

It is therefore an object of this invention to provide a read amplifier circuit that accurately detects the polarity of an input signal.

It is a further object of this invention to provide a transistor read amplifier that controls the currents and voltages in the first stage of amplification so as to be highly stable and accurate.

It is another object of this invention to provide a read amplifier that is relatively insensitive to noise and variations in supply voltages and parameter values.

It is a further object of this invention to provide a highly reliable read amplifier circuit that includes nonlinear elements so as to detect the polarity change of an input signal relatively independent of the amplitude of the input signal.

Briefly, in accordance with this invention, a read amplifier circuit is provided that detects the polarity of an input signal and provides triggering of a storage circuit such as a flip flop to a state representative of the detected polarity. The circuit includes two parallel paths each path including a transistor controlled by the input signal and a series connected inductive element, with the two parallel paths coupled to a source of constant current. First and second diodes of opposite polarity arrangement are coupled between the first and second inductive elements so that one or the other conducts in response to a small change of input polarity to mainatin an essentially constant current through the first and second inductors. A pair of differential amplifier transistors is provided to respond to a current change in the first stage and trigger a flip flop, for example. Because the currents in the inductors are essentially constant as a result of the diodes limiting the voltage change in the two current paths, a balanced current condition is obtained when the input signal attains zero or reference amplitude in the process of changing polarity. Other arrangements are provided in accordance with this invention to compensate for parameter variations of the transistors and to cancel out noise signals.

The novel features of this invention, as well as the invention itself, both as to its organization and method of operation, will best be understood from the accompanying description taken in connection with the accompanying drawings, in which like characters refer to like parts, and in which.

Figures 1, 2:
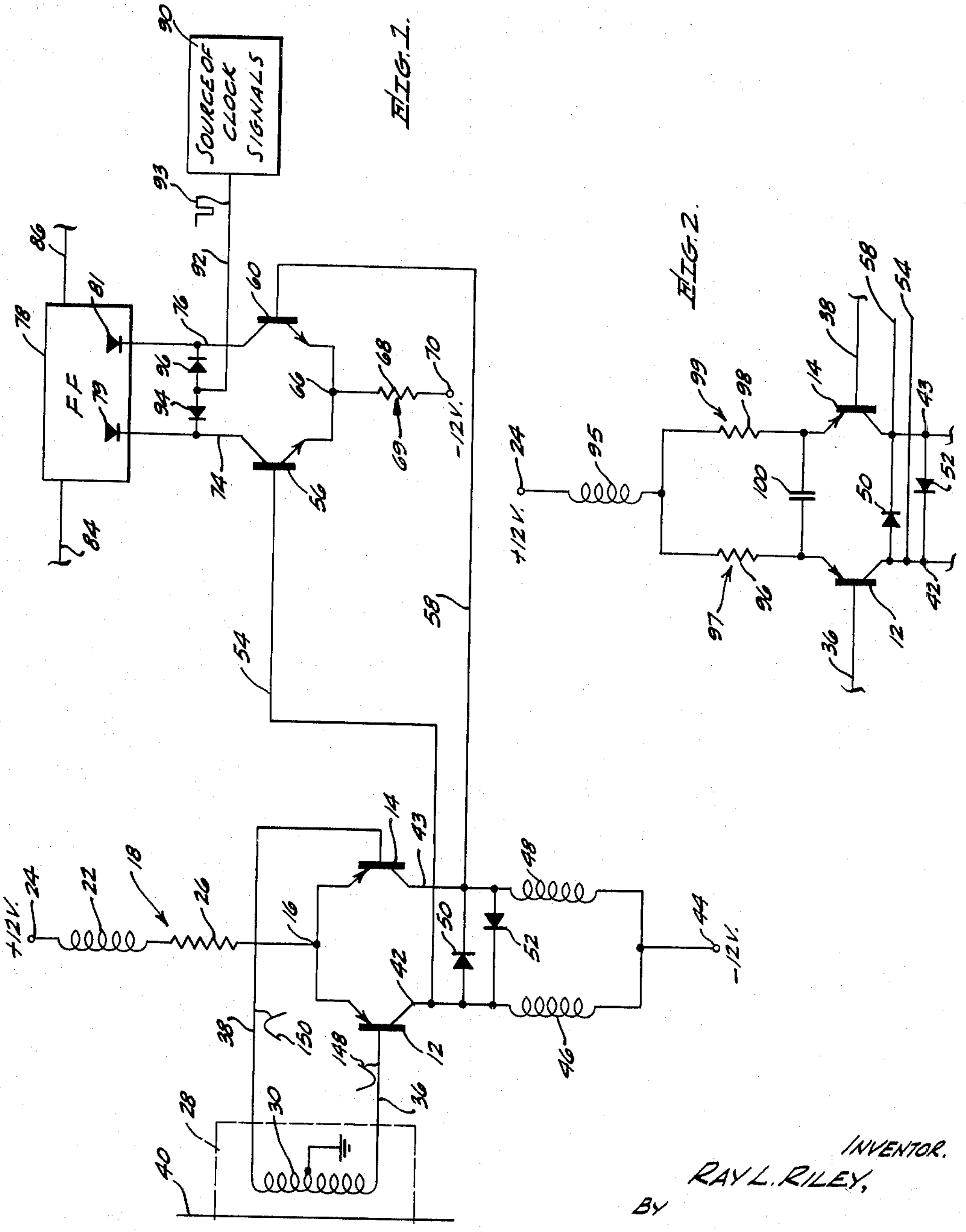
FIG. 1 is a schematic circuit diagram of the read amplifier circuit in accordance with this invention.
FIG. 2 is a schematic circuit diagram of a modification of the circuit of FIG. 1 in accordance with the invention for compensating for varying gain parameters of the transistors.

Referring first to the circuit of FIG. 1, the first stage of the read amplifier includes first and second transistors 12 and 14 which may be of the p-n-p type having their emitters coupled together at a common point 16 to provide a differential amplifier arrangement. A source 18 of substantially constant current is provided including an inductor 22 having one end coupled to a source of positive potential such as a +12 volt terminal 24 and the other end coupled to the common point 16 through a current limiting resistor 26. The inductor 22 effectively limits the rate of current changes that may result from variations of potential applied to the terminal 24, for example. The circuit may respond to signals from a source such as magnetic transducer 28 having a winding 30 with a center tap coupled to ground and opposite ends coupled to the bases of the transistors 12 and 14 through respective leads 36 and 38. The coil 30 may sense stored magnetic signals from a moving magnetic surface such as a drum 40 or from a surface such as a moving magnetic tape. It is to be noted that within the principles of this invention, the read amplifier may be utilized to sense the polarity of signals received from other arrangements such as magnetic cores.

The collectors of the transistors 12 and 14 are coupled to respective leads 42 and 43 and to a suitable source of negative potential such as a —12 volt terminal 44 through respective inductors 46 and 48 which in operation effectively pass a constant current. To limit the voltage swing at the collectors of the transistors 12 and 14 when the current is unbalanced because of a signal sensed on the leads 36 and 38, a first unidirectional current conductive device such as a diode 50 has an anode to cathode path coupled respectively between the leads 42 and 43. A second unidirectional current conductive device such as a diode 52 has an anode to cathode path coupled respectively between the leads 43 and 42. The diodes 50 and 52 may be conventional diodes such as silicon diodes having desirable non linear characteristics as will be explained subsequently, so that the voltage swing on the leads 42 and 43 is relatively small.

The voltage resulting from the current changes of the first stage is applied to a second stage of the amplifier through a lead 54 coupled from the lead 42 to the base of a transistor 56 and is applied to a lead 58 coupled from the lead 43 to the base of a transistor 60. The transistors 56 and 60 which may be of the n-p-n type provide a differential amplifier arrangement. The emitters of the transistors 56 and 60 are coupled to a common point 66 which in turn is coupled through a resistor 68 to a suitable negative source of potential such as a —12 volt terminal 70 providing a substantially constant current source 69. The collectors of the transistors 56 and 60 are respectively coupled to leads 74 and 76 which in turn are coupled to a flip flop 78, for example. Diodes 79 and 81 are shown in the flip flop 78 which may form gates therein as is well known in the art for being biased into conduction to conduct current in response to signals on the respective leads 74 and 76. The flip flop 78 has a first output lead 84 and a second output lead 86 to which is applied a high voltage signal on one and a low voltage signal on the other in response to signals on the leads 74 and 76. For sampling the signals detected by the coil 30, a source of clock signals 90 is provided coupled through a lead 92 to the anodes of diodes 94 and 96 having cathodes coupled to respective leads 74 and 76. Clock signals of a waveform 93 bias the diodes 94 and 96 out of conduction.

An arrangement as shown in FIG. 2 that compensates for variations of parameters such as base to emitter voltages of the transistors 12 and 14 includes resistors 96 and 98 coupled from an inductor 95 to the emitter of respective transistors 12 and 14 providing two sources 97 and 99, of relatively constant current. The inductor 95 is coupled directly to the terminal 24 because a common resistor is not required for current limiting when utilizing the resistors 96 and 98. The values of the resistors 96 and 98 are relatively large to overcome the effect of variations of gain parameters of the transistors 12 and 14. A capacitor 100 is coupled between the emitters of the transistors 12 and 14 for providing cross coupling for A.C. (alternating current) signals so that the differential operation is maintained.

Figures 3, 4, 5:
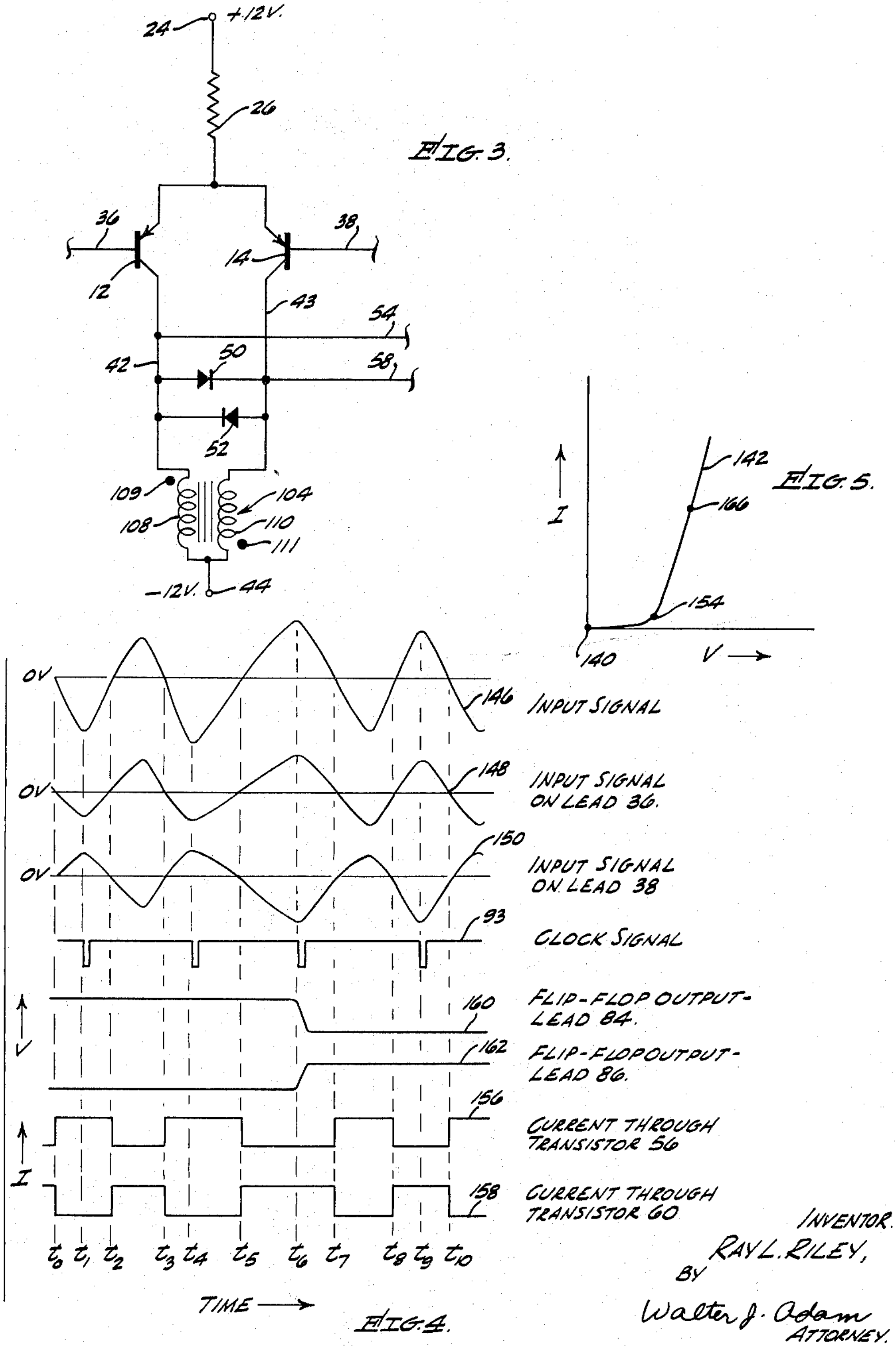
FIG. 3 is a schematic circuit diagram of a modification of the circuit of FIG. 1 in accordance with this invention for providing further cancelling of noise signals.
FIG. 4 is a diagram of waveforms for further explaining the operation of the circuit in accordance with this invention.
FIG. 5 is a graph of current versus voltage of a diode for explaining the relative insensitivity to amplitude changes of the circuits in accordance with the invention.

Another arrangement of the read amplifier in accordance with this invention as shown in FIG. 3 provides additional accuracy, reliability and immunity to noise and parameter variations. The two inductors of FIG. 1 are replaced by a magnetically coupled center tapped inductors such as a transformer 104 having first and second windings 108 and 110 coupled from respective leads 42 and 43 to the terminal 44. The windings 108 and 110 have an opposite polarity relation as indicated by dots 109 and 111.

Referring now to the waveforms of FIG. 4, the operation of the circuit of FIG. 1 will be explained in further detail. The transistors 12 and 14 have balanced or equal characteristics so that the emitter currents are approximately equal when the voltages applied to the bases thereof are equal or both at a reference or zero voltage level. The transistors 12 and 14 are selected to have substantially equal gain characteristics and are biased in their active amplification region by selecting the sources of potential at the terminals 24 and 44.

Substantially equal or balanced current flow is established through the inductors 46 and 48 because of the common characteristics of the transistors 12 and 14. When equal voltages which may be zero or reference level input signals are applied to both the leads 36 and 38, similarly equal voltages are maintained on the leads 42 and 43 and the diodes 50 and 52 are maintained in a high impedance region at a point 140 of a curve 142 of FIG. 5. In this high impedance condition, substantially zero current flows therethrough. The voltage drops across the inductors 46 and 48 are approximately equal so that the transistors 56 and 60 of the second stage are biased to conduct approximately equal currents, the total of such currents being determined by the resistor 68. This current flowing through the collector to emitter paths of the transistors 56 and 60 flows from the source of clock signals 90 because the pulse of the waveform 93 is maintained at the high voltage level to forward bias the diodes 94 and 96.

During operation in response to an input signal of a waveform 146 developed across the coil 30 as the surface of the drum 40 moves, the potential may start to fall on the lead 36 from the reference or 0 volt level at a time $t_0$ as shown by the waveform 148 (FIG. 4) and rise on the lead 38 as shown by a waveform 150 because of the center tapped arrangement of the coil 30 providing balanced signals of opposite polarity. Thus, the transistor 12 is biased into a state of increased conduction and the transistor 14 is biased into a state of decreased conduction, the increased conduction of the transistor 12 being equal to the decreased conduction of the transistor 14. As a result of this small change of current distribution of the substantially constant current from the source 18, the current attempts to increase through the inductor 46 and the voltage rises slightly on the lead 42 acting to bias the diode 50 into conduction at a low impedance state illustrated by a point 154 of the curve 142 of FIG. 5. Thus, the diode 50 conducts the increased conduction of the transistor 12. At the same time, the inductor 48 attempts to decrease current flow therethrough and the voltage falls slightly on the lead 43, also acting to bias the diode 50 into conduction. The current conduction of the diode 50 is equal to the decreased conduction of the transistor 14, thus allowing the conduction of the inductors 46 and 48 to remain unchanged. This action does not affect diode 52, which is being maintained in the high impedance state. Because the diode 50 is biased into conduction of the excess or unbalanced current, the voltage swings on the leads 42 and 43 are limited to the relatively small voltage drop across the diode 50, thus preventing the current conduction of the inductors 46 and 48 from changing significantly.

This current change shortly after time $t_0$ resulting in the increased voltage drop between the leads 42 and 43 (such increased voltage drop being limited by the conduction of the diode 50) is applied to the bases of the transistors 56 and 60. The differential operation controlled by the current source 69 provides an increase in the current flow through the collector to emitter path of the transistor 56 as shown by a waveform 156 and provides a corresponding decrease in the current flow through the collector to emitter path of the transistor 60 as shown by a waveform 158. It is to be noted that the change of current at the bases of the transistors 56 and 60 is relatively small compared to the current flowing through the inductors 46 and 48 so that the current flow through the inductors 46 and 48 is maintained substantially constant.

At a time $t_1$, the negative clock signal of the waveform 93 is applied from the source 90 through the lead 92 to the anodes of the diodes 94 and 96, biasing the diodes out of conduction. Thus, because of the relatively large current flowing through the transister 56 as shown by the waveform 156, a relatively large current flows through the diode 79 triggering the flip flop 78 into a first binary state. Thus, as well known in the art, a high level signal of a waveform 160 may be applied to the output lead 84 and a low level signal of a waveform 162 may be applied to the output lead 86. Shortly after the time $t_1$, the clock signal of the waveform 93 rises to the high level and current again flows from the source 90 through the transistors 56 and 60 and the flip flop 78 remains in the triggered stable state.

Between times $t_0$ and $t_2$, the conduction of the transistors 12 and 14 varies to a peak through the transistor 12 and to a minimum through the transistor 14 with the excess current flowing through the transistor 12 and through the diode 50. Thus, an essentially constant current is maintained through the inductors 46 and 48. Because the diode 50 is biased in the low impedance region of the curve 142 of FIG. 5, the voltage swing on the leads 42 and 43 is maintained at a minimum regardless of the amplitude of the input signal. When the input signal of the waveform 146 has a very large amplitude, the diode such as 50 moves the operating point further up the curve 142 of FIG. 5 to a point 166 which is in the low impedance region so that a relatively small voltage increase is developed across the diode 50.

At the time $t_2$, the sensed signal of the waveform 146 crosses the reference or zero voltage axis. Because the currents flowing through the inductors 46 and 48 are essentially constant, the circuit returns to a condition of approximately balanced currents at time $t_2$ and both diodes 50 and 52 are biased out of conduction. Therefore, the diodes 50 and 52 are substantially non-conductive with a very small voltage drop thereacross, so that the circuit is returned to the zero level. Thus, when opposite polarity signals are applied to the input leads 36 and 38, the circuit rapidly responds to the change of polarity from the zero level, rather than from a drifted level. In the arrangement in accordance with this invention, the zero condition is defined as that when the diodes 50 and 52 are substantially non-conductive. The reference or zero condition remains substantially constant because the current flowing through the inductors 46 and 48 is always substantially constant as a result of the relatively small voltage swing on the leads 42 and 43.

Shortly after time $t_2$, the signal of the waveform 148 goes positive and the signal of the waveform 150 goes negative biasing the transistor 14 into a state of increased conduction and the transistor 12 into a state of decreased conduction. The increased conduction of the transistor 14 is equal to the decreased conduction of the transistor 12. As a result of the change of current distribution, the current attempts to increase through the inductor 48 and the voltage rises slightly on the lead 43 to bias the diode 52 into conduction at the low impedance state of the point 154 (FIG. 5). At the same time, the inductor 46 attempts to decrease current flow therethrough and the voltage falls slightly on the lead 42. The current conduction of the diode 52 is equal to the increased conduction of the transistor 14 and equal to the decreased conduction of the transistor 12. Thus, an essentially constant current flows through the inductors 46 and 48 and the voltage swing on the leads 42 and 43 caused by the inductors is maintained at a minimum amplitude. The voltage rise on the lead 43 as determined by the voltage drop across the diode 52 is shown by the curve 142 of FIG. 5.

At the same time, shortly after time $t_2$, the voltage rise on the lead 58 causes collector to emitter current of the transistor 60 to increase as shown by a waveform 158. Because of the action of the resistor 68 the collector to emitter current of the transistor 56 decreases as shown by a waveform 156. This operation continues from time $t_2$ with increasing current flowing through the diode 52 until a peak is reached and then with decreasing current flowing through the diode 52 until time $t_3$.

It is to be noted that the input signal of the waveform 146 may be obtained from a moving surface 40 of a magnetic drum on which, in each magnetic domain or bit position of a channel, magnetic information is stored with opposite poles between the time of each two clock pulses of the waveform 93. As is well known in the art, binary bits may be written onto the surface of a drum utilizing a write clock signal at twice the frequency of the clock signal of the waveform 93. Thus, during reading, the sensed signal of the waveform 146 crosses the zero axis between each adjacent pair of clock pulses of the waveform 93 because each bit position includes two areas magnetized in opposite directions. The lines of force either are directed toward each other which may represent a stored binary "zero" or away from each other which may represent a stored binary "one."

A time $t_3$, the signals of the waveforms 148 and 150 pass through the zero axis and respectively start to go negative and positive. At the zero or reference point, both diodes 50 and 52 are again biased out of conduction so that the zero condition is present. As the transistor 12 increases conduction and the transistor 14 decreases conduction, the diode 50 is again biased into conduction because of the constant current characteristics of the indutors 46 and 48 and a minimum voltage swing is formed on the leads 42 and 43. At the same time, the potential increase on the lead 54 resulting from the voltage drop across the diode 50 is applied to the base of the transistor 56 so that a relatively large current flows through the collector to emitter path of the transistor 56 and a relatively small current flows through the collector to emitter path of the transistor 60 as shown by the respective waveforms 156 and 158. This current flows through the transistors 56 and 60 from the source 90 and through the respective diodes 94 and 96 between times $t_3$ and $t_4$. At the time $t_4$ in response to the negative clock pulse of the waveform 93, the diodes 94 and 96 are biased out of conduction and current flows through the diode 79 of the flip flop 78 to trigger the flip flop to the selected state. Because the signal of the waveform 146 is negative at time $t_4$, another "zero" binary state has been sensed from the surface 40 and the flip flop 78 remains in the same stable state after the termination of the clock pulse of the waveform 93 as shown by the waveforms 160 and 162 on respective leads 84 and 86.

At time $t_5$, the signals of the waveforms 148 and 150 pass through the zero point so that the diodes 50 and 52 are again biased out of conduction and the read amplifier is in the zero condition because a substantially constant and equal current flow is maintained through the inductors 46 and 48. At time $t_6$ as a result of the conduction of the diode 52 and increased conduction of the transistor 60 as shown by the waveform 158 the flop flop 78 is triggered to the opposite state in response to the clock pulse of the waveform 93. Thus, shortly after time $t_6$ the signals on the leads 84 and 86 are respectively negative and positive as shown by respective waveforms 160 and 162, which condition may represent a binary "one."

At a time $t_7$, the signal of the waveform 146 changes polarity as well as at time $t_8$, with the diodes 50 and 52 both being non-conductive at both times $t_7$ and $t_8$. At time $t_9$, with the transistor 14 biased into increased conduction and the excess current passing through the diode 52 and through the inductor 46, the transistors 56 and 60 are biased into respective decreased and increased conduction as shown by the waveforms 146 and 148. In response to the clock pulse at time $t_9$, increased current flows through the diode 81. The flip flop 78 is thus maintained in the similar state on the leads 84 and 86 as shown by respective waveforms 160 and 162 representing the stored binary "one." At time $t_{10}$, the signal of the waveform 146 again passes through the zero voltage and the diodes 50 and 52 are biased out of conduction. Because the operation continues in a similar manner as that discussed above, it will not be explained in further detail.

Thus, the circuit of FIG. 1 accurately detects the zero level of the input signal applied to the coil 30 substantially without any voltage drift that would result in a sensed signal being strobed or sampled with an inappropriate indication of polarity. In the circuit of FIG. 1, the diodes 50 and 52 are substantially non-conductive at the zero condition and the current flowing through the inductors 46 and 48 is equal and constant so that the circuit rapidly and accurately responds to a change of polarity of the input signal. Because the operation of the diodes 50 and 52 maintains the constant current operation of the inductors 46 and 48, the circuit is substantially free from saturation. Also, the circuit of FIG. 1 is substantially unaffected by large amplitude input signals because when the diode 50 or 52 is biased into conduction, addition input signal amplitude only causes the diode to change characteristics along the curve 142 (FIG. 5) such as to the point 166 which is in the low impedance region of operation. Thus, the voltage on the leads 42 and 43 does not rise appreciably in response to relatively high level input signals.

The arrangement of FIG. 2 has the advantage that the transistors 12 and 14 may have different characteristics and still provide the reliable zero condition each time that the input signal changes polarity. The inductor 95 together with resistors 96 and 98 provide sources of substantially equal and constant currents to the emitter to collector paths of the transistors 12 and 14. The inductor 95 limits the rate of current changes that may result from variations of voltage at the terminal 24, for example. Because the currents flowing through the resistors 96 and 98 are substantially equal as a result of the relatively large values thereof, essentially equal currents flow through the transistors 12 and 14. The capacitor 100 provides the cross coupling to pass the signal voltage changes between the emitters of the transistors 12 and 14.

To provide improved noise cancellation in accordance with the principles of this invention, the arrangement of FIG. 3 may be utilized. The common emitter inductors utilized in the arrangements of FIGS. 1 and 2 are not required in the arrangement of FIG. 3 because noise signals which may appear at the terminal 24, for example, are passed through the inductors 108 and 110 with a low impedance. The operation of the circuit of FIG. 3 is similar to that of FIG. 1 except for the center tapped transformer 104. The flux in the core of the transformer 104 due to direct currents is small because the direct currents in windings 108 and 110 develop cancelling fluxes. The transformer 104 may therefore be constructed with a relatively small and high permeability core without the core saturating during the operation. In the circuit of FIG. 3 the effective inductance presented to input signals currents by the center tapped inductor is increased by mutual inductance effects. For example, with a highly coupled inductor, the effective inductance to a signal currents is substantially twice the inductance presented by the separate inductors 108 and 110 where they not coupled.

The arrangement of FIG. 3 has the additional advantage that the common-mode noise voltages have relatively little effect on the operation of the circuit. Common-mode noise voltages are voltages that appear simultaneously on both of the bases, emitters or collectors of the transistors 12 and 14 with both having a similar rise or fall in voltage level, for example. Common-mode noise may be formed from stray signals applied to the transistors 12 and 14 from adjacent conductors utilized in a computer, for example. Common-mode noise voltages cause the currents conducted by transistors 12 and 14 and inductors 108 and 110 to increase or decrease simultaneously. The resultant voltage change on leads 42 and 43 due to the simultaneous current changes are proportional to the resultant net rate of flux change in the inductors 108 and 110. Due to the coupling of inductors 108 and 110, and the polarity of the dots 109 and 111, the flux change produced by an increase or decrease of current in inductor 108 is opposed and cancelled by the flux change produced by a simultaneous increase or decrease of current in inductor 110. The resultant net flux change is therefore negligibly small and the resultant voltage change on the leads 42 and 43 are negligibly small. Thus, the common mode noise voltages have a negligibly small effect on the accuracy of the operation.

Although the invention has been illustrated with balanced input signals, the principles of this invention are applicable to single input arrangements where the base of one transistor 12 or 14 may be coupled to ground or to another suitable level of reference potential. It is also to be understood that although the circuit of this invention has been illustrated with specific types of transistors, opposite types may be utilized in accordance with the principles of this invention by changing bias arrangements in a conventional manner.

Thus, in accordance with this invention, there has been described a read amplifier which provides an arrangement including a pair of inductors to maintain essentially constant currents through the inductors. The circuit consistently returns to a condition of approximately balanced currents at zero input signals so as to accurately and rapidly respond to the change of polarity of an input signal. The circuit is relatively insensitive to large amplitude changes of the input signals and is prevented from being saturated. In other arrangements in accordance with this invention, the circuit compensates for variations of parameters of the transistor devices and effectively cancels common-mode noise voltages.

What is claimed is:

1. A read amplifier circuit comprising a source of input signals, first and second transistors each having a control electrode coupled to said source of signals and each having a load current path, a source of substantially constant current coupled to first ends of the load current paths of said first and second transistors, a point of potential, first and second inductors respectively coupled between the second ends of the load current paths of said first and second transistors and said point of potential, a first diode having an anode to cathode path coupled respectively between the second ends of the load current paths of said first and second transistors, a second diode having an anode to cathode path coupled respectively between the second ends of the load current paths of said second and first transistors, and differential means coupled to the second ends of the load current paths of said first and second transistors.

2. A read amplifier circuit comprising a source of informational signals, first and second points of potential, first and second transistors each having a base coupled to said source of informational signals and each having a first and a second load current terminal, a source of substantially constant current coupled between said first point of potential and the first load terminals of said first and second transistors, first and second inductive means respectively coupled between the second load terminals of said first and second transistors and said second point of potential, a first diode having an anode to cathode path respectively coupled between the second load terminals of said first and second transistors, a second diode having an anode to cathode path respectively coupled between the second load terminals of said second and first transistors, differential amplifying means coupled to the second load terminals or said first and second transistors, whereby in response to signals from said source of informational signals said first or second transistor is biased into increased conduction to pass current through said respective first or second diode so that the current flowing through said first and second inductive means is maintained substantially constant, both of said diodes being non-conductive in the absence of an informational signal.

3. A read amplifier comprising a source of first and second signals of opposite polarity relative to a reference level, first and second transistors each having a base, an emitter and a collector, the bases of said first and second transistors coupled to said source of signals for respectively responding to said first and second signals, a source of substantially constant current coupled to the emitters of said first and second transistors, a point of potential, first and second inductors respectively coupled between the collectors of said first and second transistors and said point of potential, a first diode having an anode and cathode respectively coupled to the collectors of said first and second transistors, a second diode having an anode and cathode respectively coupled between the collectors of said second and first transistors, and differential means coupled to the collectors of said first and second transistors and responsive to the voltages developed thereat, whereby in response to said first and second signals one of said first or second transistor increases conduction and the other decreases conduction to respectively bias either said first or second diode into conduction to maintain substantially constant currents through said first and second inductors, the diode biased into conduction developing a voltage to control said differential means, said first and second diodes being biased out of conduction when said first and second signals return to said reference level with the current flowing through said first and second inductors remaining substantially constant.

4. A read amplifier circuit comprising a source of first and second informational signals varying with opposite polarity relations relative to a reference level, first and second transistors each having a base and a first and second electrode, the bases of said first and second transistors coupled to said source of informational signals for respectively responding to said first and second informational signals, a source of substantially constant current coupled to the first electrodes of said first and second transistors, a point of potential, a first inductor coupled between the second electrode of said first transistor and said point of potential, a second inductor coupled between the second electrode of said second transistor and said point of potential, first diode means having an anode to cathode path coupled respectively between the second electrode of said first and second transistors, second diode means having an anode to cathode path coupled respectively between the second electrodes of said second and first transistors, and means coupled to the second electrodes of said first and second transistors for responding to the potential developed thereat, one of said first and second transistors increasing in conduction and the other decreasing conduction in response to said informational signals to bias one of said diodes into conduction to pass the increased current from the transistor increasing in conduction to the inductor coupled to the transistor decreasing in conduction so as to maintain a substantially constant current flowing through said first and second inductors.

5. An amplifier circuit responsive to a source of signals comprising first and second amplifying means each having a control terminal and first and second load terminals, said control terminals coupled to said source of signals, a source of constant current coupled to the first load terminals of said amplifying means, a point of potential, first and second inductive means coupled from the second load terminals of the respective first and second amplifying means to said point of potential, first unidirectional current conductive means respectively coupled between the second load terminals of said first and second amplifying means, second unidirectional current conductive means respectively coupled between the second load terminals of said second and first amplifying means, and differential amplifier means coupled to the second terminals of said first and second amplifying means, whereby in response to signals from said source, one of said first or second amplifying means is biased into increased conduction and the other into decreased conduction with the increased current flowing through the respective one of said first and second unidirectional current conductive means so that a substantially constant current is maintained through said first and second inductive means, and said first and second diodes are both biased out of conduction at the termination of the signals applied from said source.

6. A circuit responsive to first and second signals from a source to control a bistable circuit, said first and second signals having opposite polarity relative to a reference voltage comprising first and second transistors each having an emitter, a collector and a base with the bases coupled to the source of signals for respectively responding to the first and second signals, a source of substantially constant current coupled to the emitters of said first and second transistors, a point of potential, first and second inductors coupled from the respective collectors of said first and second transistors to said point of potential, a first diode coupled between the respective collectors of said first and second transistors, a second diode coupled between the respective collectors of said second and first transistors, third and fourth transistors each having an emitter, a collector and a base, the bases of said third and fourth transistors respectively coupled to the collectors of said first and second transistors, the collectors of said third and fourth transistors coupled to the bistable circuit, a source of substantially constant current coupled between the emitters of said third and fourth transistors and said point of potential, and means coupled to the collectors of said third and fourth transistors to selectively control said bistable circuit, said first and second transistors conducting substantially equal currents when said first and second signals are at the reference voltage, in response to said signals changing from said reference voltage one of said transistors increases conduction and the other decreases conduction with the increased current flowing through one of said diodes to maintain a substantially constant current through said first and second inductors, with the signal developed by the conducting diode being applied to said third and fourth transistors to control said bistable means, whereby when said input signals return to said reference voltage said first and second diodes are biased out of conduction with the substantially constant current flow maintained through said first and second inductors.

7. A read amplifier circuit comprising a source of signals, first and second points of potential, first and second transistors each having a base and a first and second electrode, said bases of said first and second transistors coupled to said source of signals, first and second sources of substantially constant current coupled from said first point of potential to the respective first electrodes of said first and second transistors, capacitive means coupled between the first electrodes of said first and second transistors, first and second inductive means coupled respectively from the second electrodes of said first and second transistors to said second point of potential, said first and second transistors being biased in the conductive regions thereof, a first diode having an anode to cathode path coupled respectively between the second electrodes of said first and second transistors, a second diode having an anode to cathode path coupled respectively between the second electrode of said second and first transistors, and differential amplifier means coupled to the second electrodes of said first and second transistors, whereby in response to the signals from said source, said first or second transistor is biased into increased conduction and said second or first transistor is biased into decreased conduction to bias said respective first or second diode into conduction so that a substantially constant current flow is maintained through said first and second inductive means, the signal developed by said diode biased into conduction controlling said differential amplifier means.

8. A read amplifier comprising a source of informational signals, first and second transistors each having a base and first and second load current terminals, the bases of said first and second transistors coupled to said source of signals, a source of substantially constant current coupled to the first load current terminals of said first and second transistors, a point of potential, a transformer having first and second windings each with one end coupled to said point of potential and the other ends respectively coupled to the second load terminals of said first and second transistors, a first diode having an anode to cathode path respectively coupled to the second load terminals of said first and second transistors, a second diode having an anode to cathode path respectively coupled to the second load current terminals of said second and first transistors, and differential amplifier means coupled to the second load terminals of said first and second transistors, whereby in response to said informational signals said first or second transistor is biased into increased conduction, said respective second or first transistor is biased into decreased conduction and said respective first or second diode is biased into conduction to maintain a substantially constant current flowing through said first and second windings.

9. A read amplifier circuit comprising a source of first and second informational signal varying with opposite polarity around a reference voltage, first and second transistors each having a base, an emitter and a collector, the bases of said first and second transistors coupled to said source of informational signals for respectively responding to said first and second informational signals, first and second points of potential, first and second impedance means respectively coupled between the emitters of said first and second transistors and said first point of potential, first inductive means coupled between said first and second impedance means and said first point of potential, second and third inductive means respectively coupled between the collectors of said first and second transistors and said second point of potential, first diode means having an anode to cathode path coupled respectively between the collectors of said first and second transistors, second diode means having an anode to cathode path coupled respectively between the collectors of said second and first transistors, said first and second diode means having non linear current versus voltage characteristics, and differential means coupled to the collectors of said first and second transistors for responding to the potential developed thereat, said first and second transistors being biased in a region to conduct substantially equal currents when said informational signals are at said reference voltage, whereby said first or second transistor is biased into increased conduction and the second or first transistor is biased into decreased conduction in response to said informational signals to bias said respective first or second diode means into conduction and maintain a substantially constant current flowing through said second and third inductive means, said differential means responding to the conduction of said first or second diode means, said first and second diode means being biased out of conduction when said informational signals return to said reference voltage because the substantially constant current is maintained through said second and third inductive means.

No references cited.

ARTHUR GAUSS, *Primary Examiner.*

GEORGE N. WESTBY, *Examiner.*